United States Patent [19]
Preston

[11] Patent Number: 5,193,027
[45] Date of Patent: Mar. 9, 1993

[54] OPTICAL FILTER TUNING APPARATUS AND AN OPTICAL FILTERING METHOD

[75] Inventor: Keith R. Preston, Woodbridge, England

[73] Assignee: British Telecommunications plc, London, United Kingdom

[21] Appl. No.: 743,404

[22] PCT Filed: Jan. 12, 1990

[86] PCT No.: PCT/GB90/00049

§ 371 Date: Aug. 14, 1991

§ 102(e) Date: Aug. 14, 1991

[87] PCT Pub. No.: WO90/08335

PCT Pub. Date: Jul. 26, 1990

[30] Foreign Application Priority Data

Jan. 13, 1989 [GB] United Kingdom ............... 8900730

[51] Int. Cl.[5] .......................... G02B 5/32; G02B 5/18; G02B 5/26
[52] U.S. Cl. ............................ 359/566; 359/572
[58] Field of Search .................. 385/15, 33, 37; 359/529, 572, 576, 578, 589, 566, 15, 558

[56] References Cited

U.S. PATENT DOCUMENTS

| 4,569,569 | 2/1986 | Stewart | 350/350 |
| 4,669,811 | 6/1987 | McQuoid | 359/572 X |
| 4,671,603 | 6/1987 | McQuoid et al. | 385/15 X |
| 5,039,201 | 8/1991 | Liu | 359/589 |

OTHER PUBLICATIONS

Optics Letters, vol. 10, No. 6, Jun. 1985, Optical Society of America, D. J. McCartney et al: "Position-tunable holographic filters in dichromated gelatin for use in single-mode-fiber demultiplexers".

Primary Examiner—Constantine Hannaher
Assistant Examiner—Edward J. Glick
Attorney, Agent, or Firm—Nixon & Vanderhye

[57] ABSTRACT

An optical filter tuning apparatus and filtering method uses an optical filter that reflects light of a predetermined wavelength which is dependent on the position of incidence of the light on the filter and a retroreflector moveable with respect to the filter and which reflects light from an optical source to the position of incidence and reflects light of the predetermined wavelength from the filter to an optical receiver.

17 Claims, 2 Drawing Sheets

OPTICAL FILTER TUNING APPARATUS AND AN OPTICAL FILTERING METHOD

BACKGROUND OF THE INVENTION

1. Field of the Invention

The present invention relates to an optical filter tuning apparatus and optical filtering method.

2. Description of Related Art

In order to filter light emitted from an optical fibre a chirped dichromated gelatin (DCG) filter may be used. A filter of this type is described in a paper entitled "Position—tunable holographic filters in dichromated gelatin for use in single - mode - fiber demultiplexers", Optical Letters, Vol. 10, page 303, Jun. 1985. Light is normally directed from an input optical fibre onto the chirped grating filter using a lens arrangement. As the filter is a chirped grating the wavelength of light reflected therefrom is dependent on the position of incidence of the light from the input fibre. To adjust the filtering characteristics of this filter arrangement, which is described in detail hereinafter, the filter must be moved relative to the lens and input fibre so as to alter the position of incidence. To effect this adjustment regard must be had to very stringent angular tolerances in two planes. The restrictions imposed by the tolerances necessitate the use of an elaborate and expensive support mechanism on which the filter arrangement must be mounted. Hence, it is desirable to provide a filter apparatus and filtering method which reduces the angular tolerances that must be set.

SUMMARY OF THE INVENTION

In accordance with the present invention there is provided an optical tuning apparatus comprising:

an optical filter which reflects light of a predetermined wavelength, said wavelength being determined by the position of incidence of said light on said filter; and a retroreflector moveable with respect to said filter and which is used to reflect light from an optical source to said position of incidence on said filter and reflect light of said predetermined wavelength to optical receiving means;

said position of incidence and said predetermined wavelength being adjustable by moving said retroreflector with respect to said filter.

In accordance with the present invention there is also provided an optical filtering method comprising:

reflecting light to be filtered from an optical source onto an optical filter using a retroreflector, the wavelength of light reflected from said filter being dependent on the position of incidence of light on said filter and said retroreflector being moveable with respect to said filter so as to adjust said position of incidence; and reflecting said reflected light of said predetermined wavelength to optical receiving means using said retroreflector.

BRIEF DESCRIPTION OF THE DRAWINGS

Preferred embodiments of the present invention will now be described, by one example only, with reference to the accompanying drawings wherein.

DESCRIPTION OF THE PREFERRED EMBODIMENTS

Figure 1:
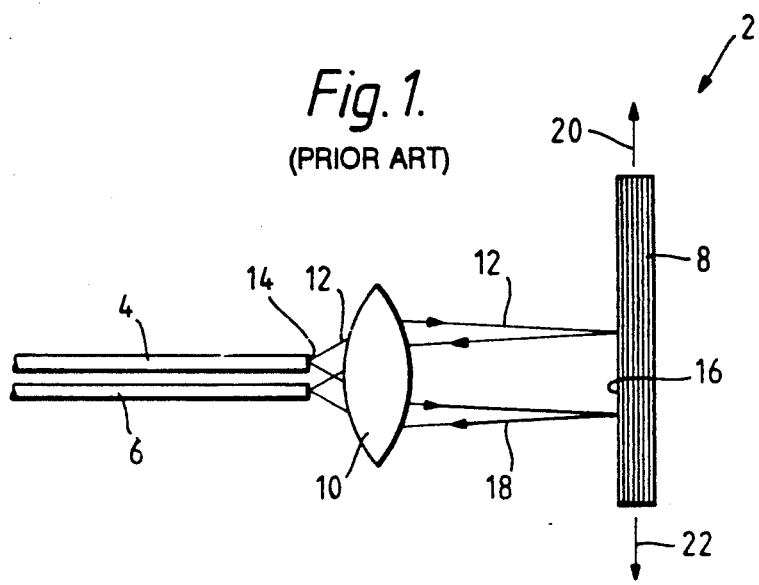
FIG. 1 is a schematic diagram of a known filter arrangement.

A known optical filter arrangement 2, as shown in FIG. 1, includes an input optical fibre 4 and an output optical fibre 6, a chirped grating dichromated gelatin (DCG) filter 8 and a lens 10 disposed between the fibres 4 and 6 and the filter 8. The input optical fibre 4 carries light 12 to be filtered which is emitted from the end 14 of the input fibre 4 and directed onto the filter 8 by the lens 10. The relative positions of the input fibre 4, the lens 10 and the filter 8 determines the point of incidence 16 of the light 12 on the filter 8.

The filter arrangement 2 further includes an output optical fibre 6 which is aligned with and parallel to the input fibre 4. The output fibre 6 is used to receive light 18 reflected from the filter 8. The reflected light 18 is directed into the output fibre 6 by the lens 10. The wavelength of the reflected light 18 is dependent on the position of the point of incidence 16. By moving the filter 8 with respect to the lens 10 in one of the directions indicated by the arrows 20 and 22, without altering the lateral distance between the lens 10 and the filter 8, the point of incidence 16 of the light 12 on the filter 8 is altered and the wavelength of the reflected light 18 is adjusted correspondingly. Thus, the filtering characteristics of the filter arrangement 2 can be adjusted or tuned as desired due to the inherent properties of the chirped grating DCG filter 8.

The filter arrangement 2 is mounted on a support mechanism (not shown) which ensures the relative positions of the fibres 4 and 6, lens 10 and filter 8 are maintained and during tuning of the arrangement 2 only movement of the filter 8 in the directions indicated by the arrows 20 and 22 is permitted. Generally, the mechanism provides for a 40 to 80 mm movement of the filter 8. The support mechanism is, however, normally elaborate and expensive as movement of the filter 8 must be performed within very stringent angular tolerances. The tolerances are with respect to the angles of incidence and reflection for the incident light 12 and reflected light 18 with respect to the lens 10 and the filter 8. For example, if the input and output fibres 4 and 6 are multimode fibres having a core diameter of 50 $\mu$m and the lens has a focal length of 5 mm with respect to the fibres 4 and 6, the angles of incidence and reflection cannot vary by more than 0.1°. If single mode fibre, having a core diameter of 8 $\mu$m, is used instead the angular tolerance is about 40". The tolerances must be met to ensure the output fibre 6 receives the reflected filtered light 18. The restrictive tolerances are due primarily to the size of the core of the output fibre 6, which generally has a cross-sectional radius of between 4 to 25 $\mu$m, and the focal length with respect to the lens 10 and fibres 4 and 6, which is usually about 5 mm. The same problem would exist if other optical waveguides of similar size, such as silica waveguides, were used instead of fibres 4 and 6.

Figure 2:
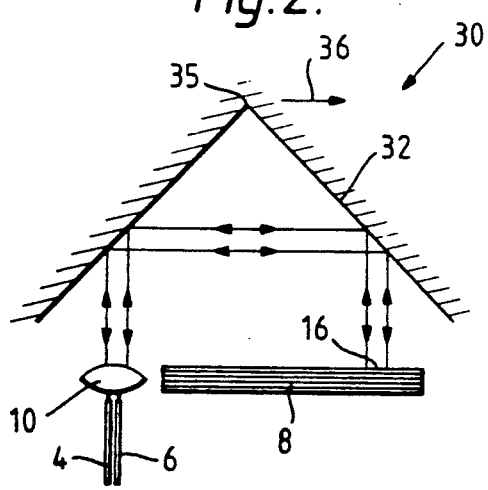
FIG. 2 is a schematic diagram of a first preferred embodiment of a filter tuning apparatus according to the present invention tuned to a short wavelength.

An optical filter tuning apparatus 30, as shown in FIG. 2, is similar to the filter arrangement 2 described previously in that it includes input and output fibres 4 and 6, a lens 10, and a chirped grating DCG filter 8. The tuning apparatus 30, however, further includes a retroreflector 32 and the lens 10 is disposed adjacent an end of the filter 8 and is also substantially coplanar therewith. The retroreflector 32 is a device which comprises three mirrors or prism facets which are joined together so as to be precisely orthogonal with respect to one another. A typical structure of a retroreflector resembles three sides of a hollow cube having a common vertex, wherein the inner faces of the sides have mirrored surfaces.

Figure 3:
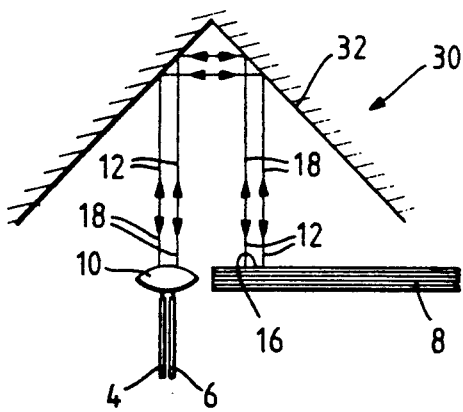
FIG. 3 a schematic diagram of the apparatus of FIG. 2 tuned to a long wavelength.

The retroreflector 32 is positioned with respect to the lens 10 and filter 8 so as to reflect light 12 from the input fibre 4 onto the filter 8 and reflect filtered light 18 from the filter 8 onto the lens 10 so as to be directed into the output fibre 6. The input and output fibres 4 and 6, the lens 10 and the filter 8 are mounted in fixed positions on a support mechanism (not shown) so that light received by and transmitted from the lens 10 propagates in a direction parallel to the direction of propagation of light received and reflected from the filter 8. This arrangement is possible because light incident on a mirror face of the retroreflector 32 will always be reflected from the retroreflector 32 in a direction which is opposite and parallel (if not colinear) to the direction of incidence. Thus, the tuning apparatus 30 is arranged, as shown in FIGS. 2 and 3, so that the light 12 to be filtered travels on approximately the same path as the filtered light 18 reflected from the filter 8 and the angles of incidence and reflection associated with the filter 8 are approximately 90°. a slight difference in the path of travel, however, is induced by slightly angling the filter 8 so as to enable the filtered light 18 to be directed by the lens 10 into output fibre 6 instead of the input fibre 4.

The filter tuning apparatus 30 as illustrated in FIG. 2, is tuned so as to filter for light of a short wavelength. In order to perform a filtering operation for light of a longer wavelength the position of the point of incidence 16 must be moved and this is achieved by moving the vertex 35 of the retroreflector 32 horizontally with respect to the lens 10 and the filter 8, in the direction of the arrow 36 to the position shown in FIG. 3. There are no restrictive tolerances associated with adjusting or tuning the apparatus 30 because only movement of retroreflector 32 needs to be effected. Due to the inherent reflection properties of the retroreflector 32, as discussed previously, the retroreflector 32 may be tilted, rotated and even moved 1 to 2 mm vertically without affecting the parallel relationship with respect to the paths of the light received and emitted from the lens 10 and the light received and reflected by the filter 8. Hence, the filter tuning apparatus 30 may be mounted on a relatively inexpensive support structure and alignment mechanism. The optical path length from the lens 10 to the filter 8 is the same for each selected point of incidence 16 and the wavelength of the reflected light 18 selected is dependent only on the position of the retroreflector vertex 35. Also, for a given chirp rate, the movement of the retroreflector 32 required to alter the selected wavelength is approximately half of what would be required to cover the same wavelength range if either the filter 8 or the lens 10 and fibres 4 and 6 were to be moved.

Figure 4:
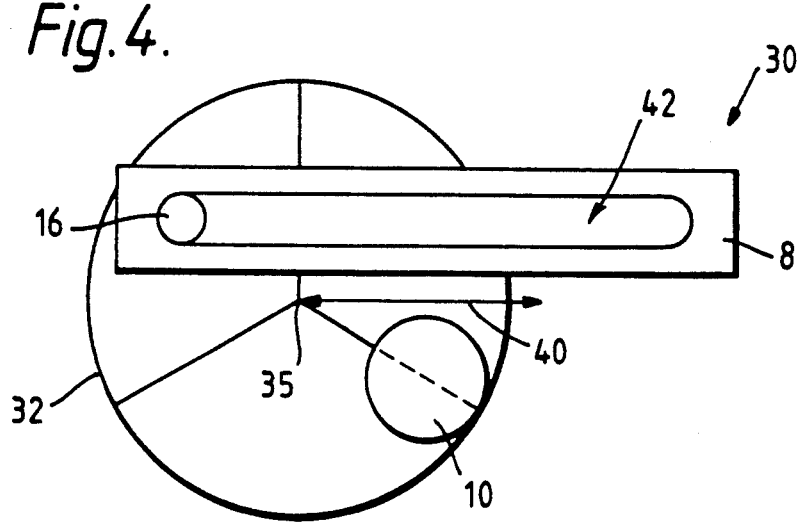
FIG. 4 is a plan schematic view of a second preferred embodiment of a filter tuning apparatus according to the present invention.
Figure 5:
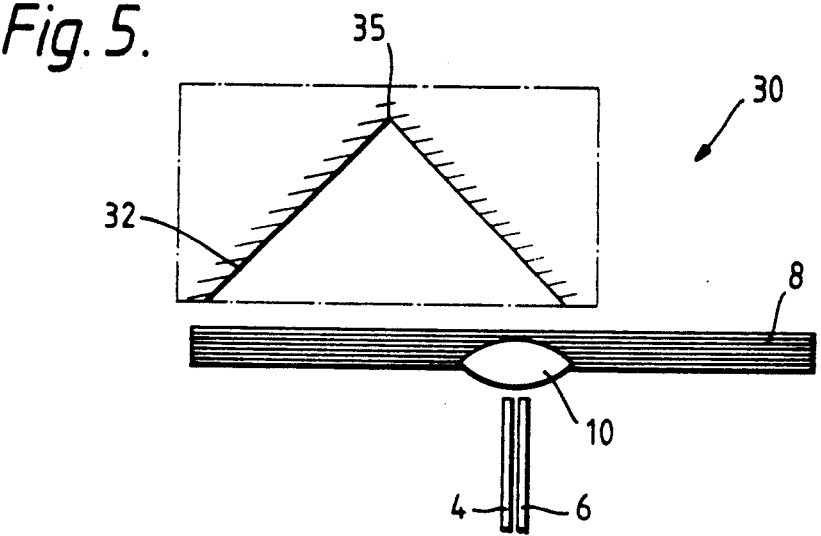
FIG. 5 is side schematic view of the apparatus of FIG. 4.
Figure 6:
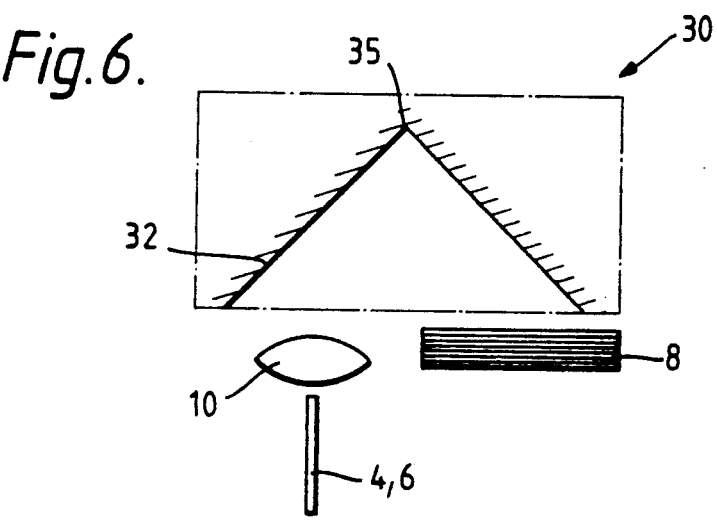
FIG. 6 is an end schematic view of the apparatus of FIG. 4.

An alternative and more compact arrangement of the filter tuning apparatus 30 is illustrated in FIGS. 4 to 6. In this arrangement instead of placing the lens 10 and input and output fibres 4 and 6 adjacent one end of the filter 8, the lens and fibre assembly is positioned adjacent to one side of the filter 8, as is best shown in FIG. 4. Adjusting the wavelength of filtered light is still achieved by moving the vertex 35 of the retroreflector 32 horizontally with respect to the remaining parts of the apparatus 30. The retroreflector 32 is moved along a path indicated by the double headed arrow 40, which results in movement of the point of incidence 16 along a parallel path 42. The particular advantage of this more compact arrangement is that due to relative positions of the fixed filter 8 and lens 10 and fibres 4 and 6 the diameter of the retroreflector 32 can be reduced by approximately one half.

The tuning apparatus 30 is amenable to a further development and use in other applications, for example, two-dimensional movement of the retroreflector 32 may be used to allow light to be selectively reflected onto one of several filters 8 which each cover a different wavelength range. Also, a single source, such as a laser, may transmit light to and receive light from the filter 8. A single fibre may also be used as the input and output fibres 4 and 6.

I claim:

1. An optical filter tuning apparatus comprising:
    an optical filter which reflects light of a predetermined wavelength, said wavelength being determined by the position of incidence of said light on said filter; and
    a retroreflector moveable relative to said filter and which is used to reflect light from an optical source to said position of incidence on said filter and reflect light of said predetermined wavelength to optical receiving means;
    said position of incidence and said predetermined wavelength being adjustable by moving said retroreflector with respect to said filter.

2. An optical filter tuning apparatus as claimed in claim 1, further comprising lens means to direct light from said source onto said retroreflector and direct filtered light from said retroreflector to said receiving means, said lens means and said optical filter being positionally fixed with respect to one another.

3. An optical filter tuning apparatus as claimed in claim 2, wherein said filter and said lens means lie substantially in a first plane and said retroreflector is moveable such that the vertex of said retroreflector is moveable in a second plane substantially parallel to said first plane.

4. An optical filter tuning apparatus as claimed in claim 1 wherein light incident on and filtered light reflected from said filter travel along substantially the same path.

5. An optical filter tuning apparatus as claimed in claim 1 wherein said filter is a chirped grating dichromated gelatin (DCG) filter.

6. An optical filter tuning apparatus as claimed in claim 1 wherein said source serves also as said receiving means.

7. An optical filter tuning apparatus as claimed in claim 1 wherein said source and said receiving means are input and output optical fibres, respectively.

8. An optical filtering method comprising:
    reflecting light to be filtered from an optical source onto an optical filter using a retroreflector, the wavelength of light reflected from said filter being dependent on the position of incidence of light on said filter and said retroreflector being moveable relative to said filter so as to adjust said position of incidence; and reflecting said reflected light of said predetermined wavelength to optical receiving means using said retroreflector.

9. An optical filtering method as claimed in claim 8, further comprising directing light from said source onto said retroreflector and directing filtered light to said receiving means, using lens means, said lens means and said optical filter being positionally fixed with respect to one another.

10. An optical filtering method as claimed in claim 9, further comprising adjusting said position of incidence and said predetermined wavelength by moving the vertex of said retroreflector in a first plane substantially parallel to a second plane in which said lens means and said filter substantially lie.

11. An optical filtering method as claimed in claim 8, wherein light incident on and filtered light reflected from said filter travel along substantially the same path.

12. An optical filtering method as claimed in claim 8, wherein said filter is a chirped grating dichromated gelatin (DCG) filter.

13. An optical filtering method as claimed in claim 8 wherein said source means serves also as said receiving means.

14. An optical filtering method as claimed in claim 8, wherein said source and said receiving means are input and output optical fibres, respectively.

15. A tunable optical filter apparatus comprising:
a chirped optical filter grating;
optical signal input and output ports that are fixed with respect to said grating; and
an optical retroreflector optically coupling said input and output ports to said grating, said retroreflector being movable with respect thereto.

16. A tunable optical filter apparatus as in claim 15 wherein said input and output ports are at least partly coincident with each other.

17. A tunable optical filter apparatus comprising:
a chirped optical filter grating; and
an optical signal retroreflector that is movable with respect to said grating to adjust the position of optical signal incidence on the grating.

* * * * *